United States Patent
Morohoshi et al.

(10) Patent No.: US 7,206,496 B2
(45) Date of Patent: Apr. 17, 2007

(54) DIGITAL RECORDING/PLAYBACK APPARATUS

(75) Inventors: Toshihiro Morohoshi, Kawasaki (JP); Kazuo Konishi, Sagamihara (JP); Masafumi Umeda, Ome (JP); Takato Katagiri, Ome (JP); Kazuhiro Takashima, Tokyo (JP); Tomiyoshi Fukumoto, Kawasaki (JP); Masao Iwasaki, Fuchu (JP); Tsuyoshi Hagiwara, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1260 days.

(21) Appl. No.: 10/025,781

(22) Filed: Dec. 26, 2001

(65) Prior Publication Data

US 2002/0089901 A1 Jul. 11, 2002

(30) Foreign Application Priority Data

Dec. 27, 2000 (JP) ............................. 2000-398855
Dec. 27, 2000 (JP) ............................. 2000-398856

(51) Int. Cl.
*H04N 5/91* (2006.01)

(52) U.S. Cl. ........................... 386/68; 386/69; 386/70; 386/124

(58) Field of Classification Search ................ 386/68, 386/69, 70, 124
See application file for complete search history.

(56) References Cited

U.S. PATENT DOCUMENTS 6,005,564 A * 12/1999 Ahmad et al. .............. 715/723
6,009,231 A * 12/1999 Aoki et al. .................... 386/68
6,154,603 A * 11/2000 Willis et al. ................. 386/125
6,167,465 A * 12/2000 Parvin et al. ................. 710/22
6,477,632 B1 * 11/2002 Kikuchi ....................... 711/203
6,606,715 B1 * 8/2003 Kikuchi ........................ 714/15
2001/0033581 A1 * 10/2001 Kawarai et al. ............. 370/468

FOREIGN PATENT DOCUMENTS

| EP | 1111612 | * | 9/1999 |
| EP | 1 049 096 A | | 11/2000 |
| EP | 1 111 612 A | | 6/2001 |
| JP | 10-271457 | | 10/1998 |
| WO | WO 00/14741 A | | 3/2000 |

OTHER PUBLICATIONS

Reference: ISO/IEC 13818-1:1996, pp. vii-xii and 8-59.
Communication consisting of a search report from the European Patent Office dated Jan. 5, 2006 for European Patent Application No. 01130878.0.

* cited by examiner

*Primary Examiner*—Thai Q. Tran
*Assistant Examiner*—Helen Shibru
(74) *Attorney, Agent, or Firm*—Finnegan, Henderson, Farabow, Garrett & Dunner, L.L.P.

(57) ABSTRACT

A control system realizes a playback function by playing back stream data read out from a medium by using a decoder. When special playback functions corresponding to pause, fast forward, and rewind are to be performed, the control system moves a read start pointer to the head of a data block constructing a data format, and sets as a restart position of a playback operation.

3 Claims, 5 Drawing Sheets

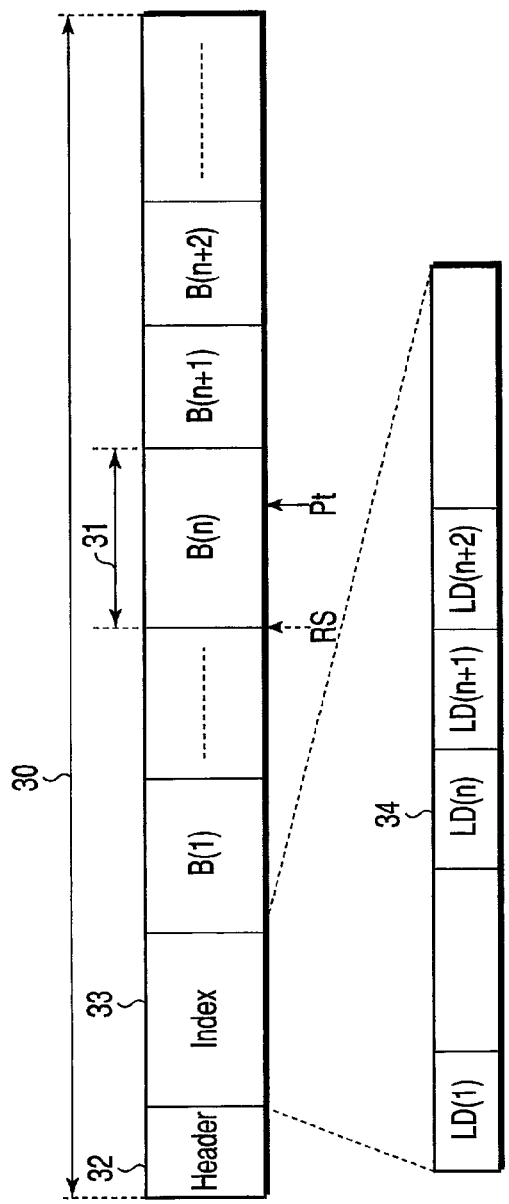
F I G. 3
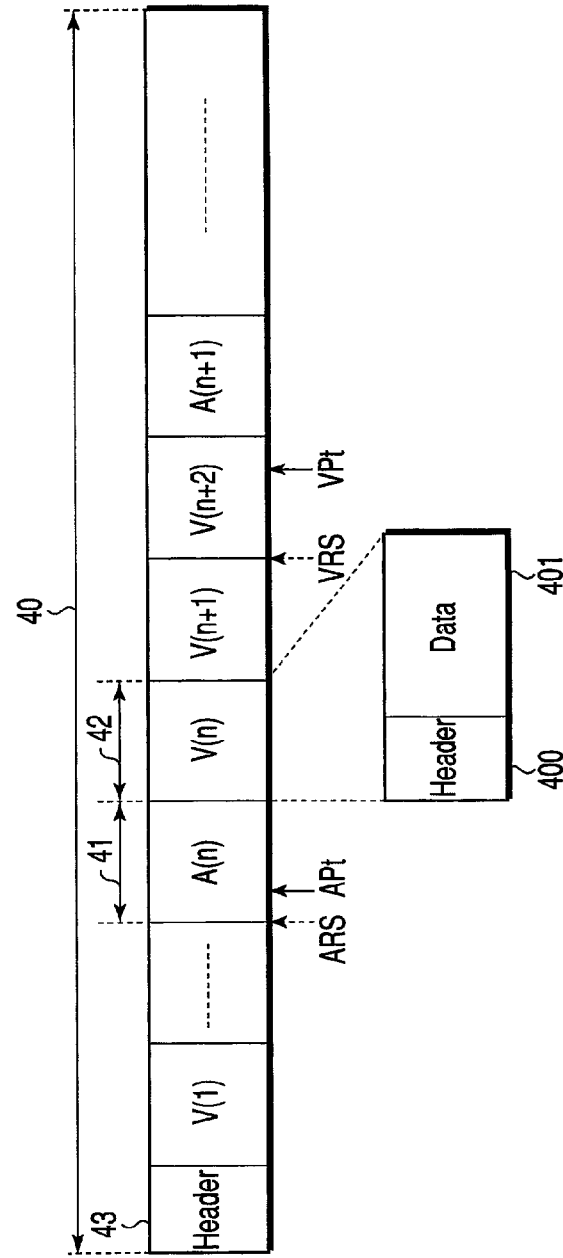
F I G. 4

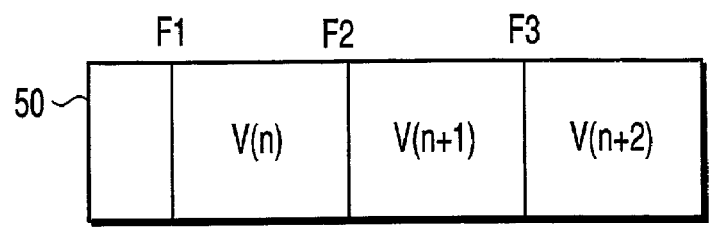
FIG. 5A
FIG. 5B
| Block | Buffer address | Time |
|---|---|---|
| n | F1 | Tb |
| n+1 | F2 | Tc |
| n+2 | F3 | Td |
| ⋮ | ⋮ | ⋮ |
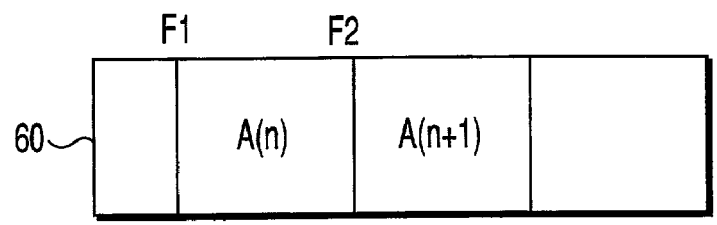
FIG. 6A
FIG. 6B
| Block | Buffer address | Time |
|---|---|---|
| n | F1 | Ta |
| n+1 | F2 | Te |
| ⋮ | ⋮ | ⋮ |

DIGITAL RECORDING/PLAYBACK APPARATUS

CROSS-REFERENCE TO RELATED APPLICATIONS

This application is based upon and claims the benefit of priority from the prior Japanese Patent Application No. 2000-398855, filed Dec. 27, 2000, the entire contents of which are incorporated herein by reference.

BACKGROUND OF THE INVENTION

1. Field of the Invention

The present invention generally relates to a digital recording/playback apparatus for recording and playing back digital stream data such as images and sounds and, more particularly, to a digital recording/playback apparatus for recording and playing back moving image data from a digital video camera.

2. Description of the Related Art

Recently, a digital recording/playback apparatus has been developed which can save stream data composed of moving image data and sound data sensed and recorded by a digital video camera into a medium such as a large-capacity hard disk drive (HDD) or CD-R (writable CD), and can play back the data on a monitor screen such as a TV screen.

This apparatus can be applied to a digital codec apparatus, such as a TV telephone, for in-stream playback. A digital recording/playback apparatus saves stream data by converting it into compressed data configured by a predetermined data format. A playback mode such as in-stream playback requiring no random access need not have any playback sequence change functions (special playback functions) such as pause, fast forward, and rewind. Therefore, these special playback functions are not taken into account in the data format.

The conventional digital recording/playback apparatuses are applied to digital codec apparatuses primarily used for in-stream playback and having no special playback functions such as pause, fast forward, and rewind. A digital recording/playback apparatus is originally equipped with a medium such as an HDD or CD-R drive capable of random access, and can therefore realize special playback functions such as pause, fast forward, and rewind. However, the data format of stream data does not usually take account of these special playback functions. Hence, when pause, fast forward, or rewind is simply executed, a read start pointer (information indicative of a read start position when data is to be read out from a medium during playback) is moved to an arbitrary position in stream data stored in a medium, and the data is read out from that position. Therefore, if this read start pointer is present at an arbitrary position in a certain block (packet) of the data format, only a part of data in that block is played back. Consequently, a playback error (decoding error) such as mute (no playback) sometimes occurs.

BRIEF SUMMARY OF THE INVENTION

It is, therefore, an object of the present invention to provide a digital recording/playback apparatus capable of realizing special playback functions corresponding to pause, fast forward, and rewind, when stream data is to be played back from a medium which can be randomly accessed.

The present invention relates to a digital recording/playback apparatus which records and plays back moving image data (stream data) from, e.g., a digital video camera, and which can realize special playback functions corresponding to pause, fast forward, and rewind, even when the data format does not take account of these special playback functions.

More specifically, a digital recording/playback apparatus of the present invention comprises data storage means for storing stream data having a predetermined data format, playback means for reading out the stream data from the storage means and playing back the readout data, and playback control means for performing control, when the playback means is to perform a playback operation, such that a read start position of the stream data is determined, and this read start position is set at a leading position of a predetermined block of the data format.

With this arrangement, when pause, fast forward, or rewind is executed for stream data having a data format made up of a plurality of data blocks (packets), a read start pointer indicative of an arbitrary position in a certain data block can be moved to the leading position of this data block. Therefore, the next playback operation is started from the leading position of the data block, so a normal playback operation is restarted. In short, special playback functions corresponding to pause, fast forward, and rewind can be realized independently of a data format. Accordingly, a digital recording/playback apparatus of the present invention can be applied not only to a digital codec apparatus assuming an in-stream playback function but also to a digital information apparatus assuming a playback function which can effectively achieve a random access function.

BRIEF DESCRIPTION OF THE SEVERAL VIEWS OF THE DRAWING

FIG. 3 is a view showing a non-fixed-length data format according to the embodiment;

FIG. 4 is a view showing an AV-mixed data format according to the embodiment;

FIG. 5A is a view showing a video FIFO buffer based on the AV-mixed data format;

FIG. 5B is a view showing a video information table based on the AV-mixed data format;

FIG. 6A is a view showing an audio FIFO buffer based on the AV-mixed data format;

FIG. 6B is a view showing an audio information table based on the AV-mixed data format;

DETAILED DESCRIPTION OF THE INVENTION

An embodiment of the present invention will be described below with reference to the accompanying drawings.

(Arrangement of Digital Recording/Playback Apparatus)

Figure 1:
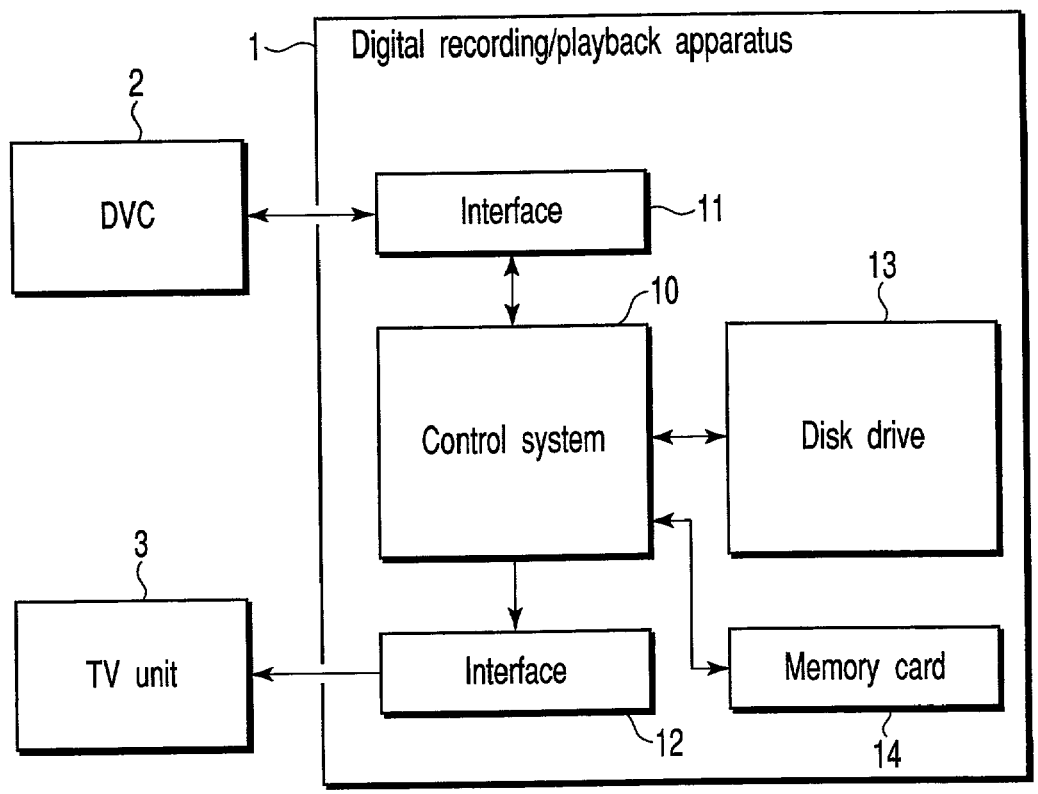
FIG. 1 is a block diagram showing the major parts of a digital recording/playback apparatus according to an embodiment of the present invention.

FIG. 1 is a block diagram showing the main parts of a digital recording/playback apparatus according to this embodiment.

As shown in FIG. 1, a digital recording/playback apparatus 1 of this embodiment has functions of receiving stream data from a digital video camera (DVC) 2, and playing back the data on a screen such as a television unit (TV unit) 3. This apparatus 1 comprises a control system (having a CPU as its main element) 10 for controlling the whole apparatus, an interface 11 for receiving stream data transferred from the DVC 2, an interface 12 for outputting playback data to the TV unit 3, a disk drive 13 for storing stream data such that the data can be randomly accessed, and a memory card 14.

As will be described later, the control system 10 has a decoder for realizing a normal in-stream playback function and special playback functions corresponding to pause, fast forward, and rewind. The disk drive 13 is a hard disk drive (HDD) or an optical disk drive such as a rewritable CD-R, and will be generally referred to as a medium hereinafter. The memory card 14 is an interchangeable medium and stores video data (including still images) and audio data downloaded by the control system 10.

Note that the apparatus 1 further comprises an operation unit for performing various input operations, but this operation unit is omitted from FIG. 1.

(Special Playback Operations)

Figure 7:
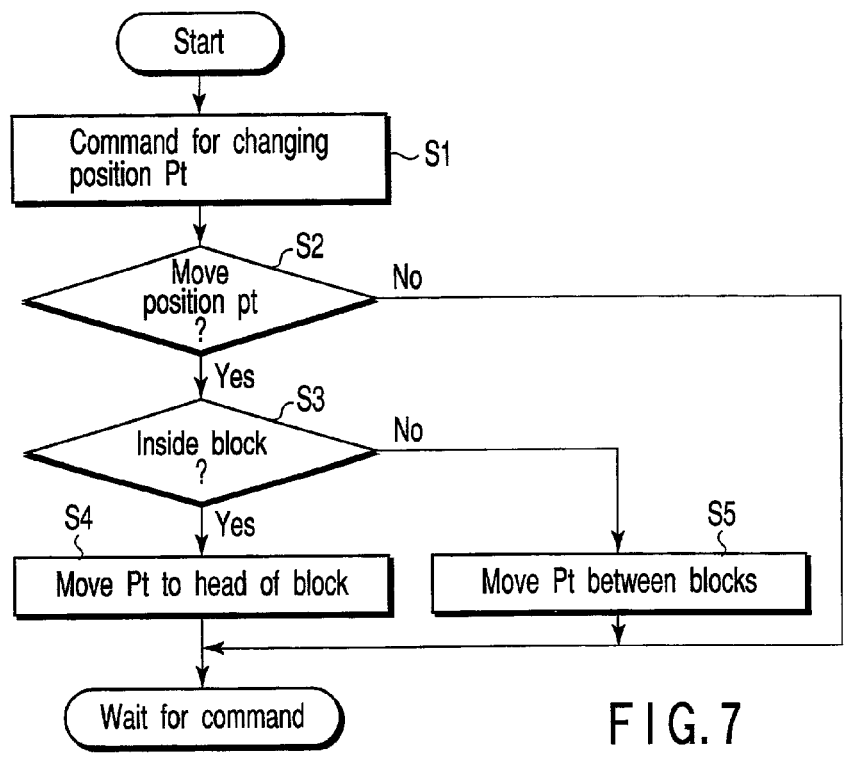
FIG. 7 is a flow chart for explaining playback when the fixed-length data format according to the embodiment is used.
Figure 8:
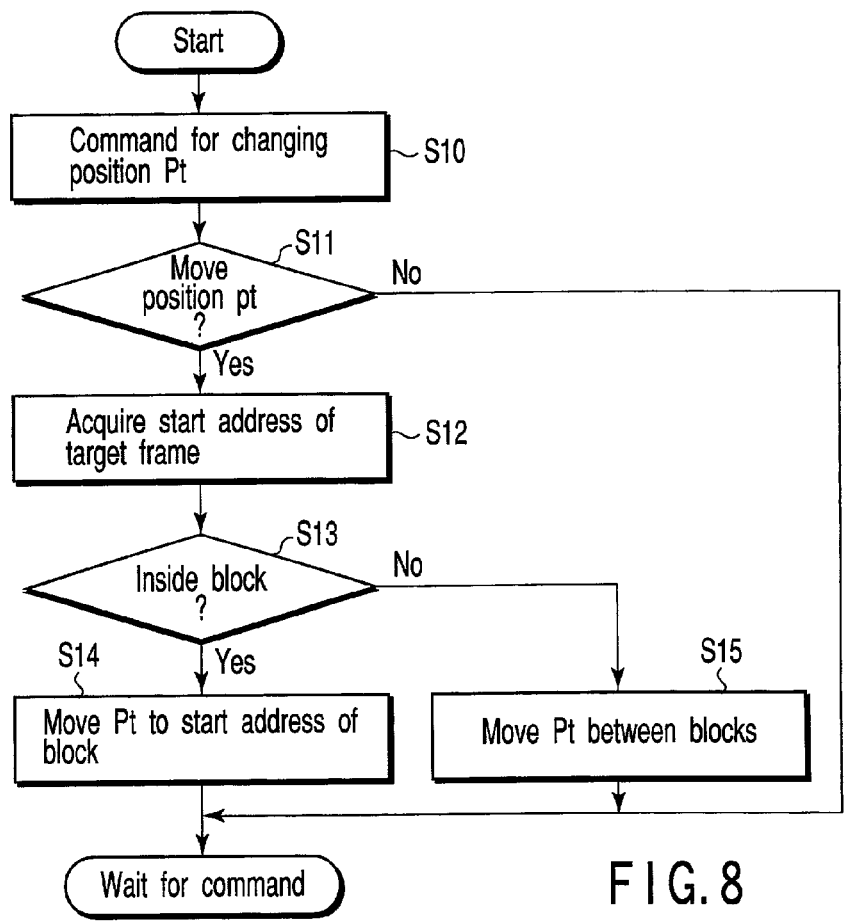
FIG. 8 is a flow chart for explaining playback when the non-fixed-length data format according to the embodiment is used.
Figure 9:
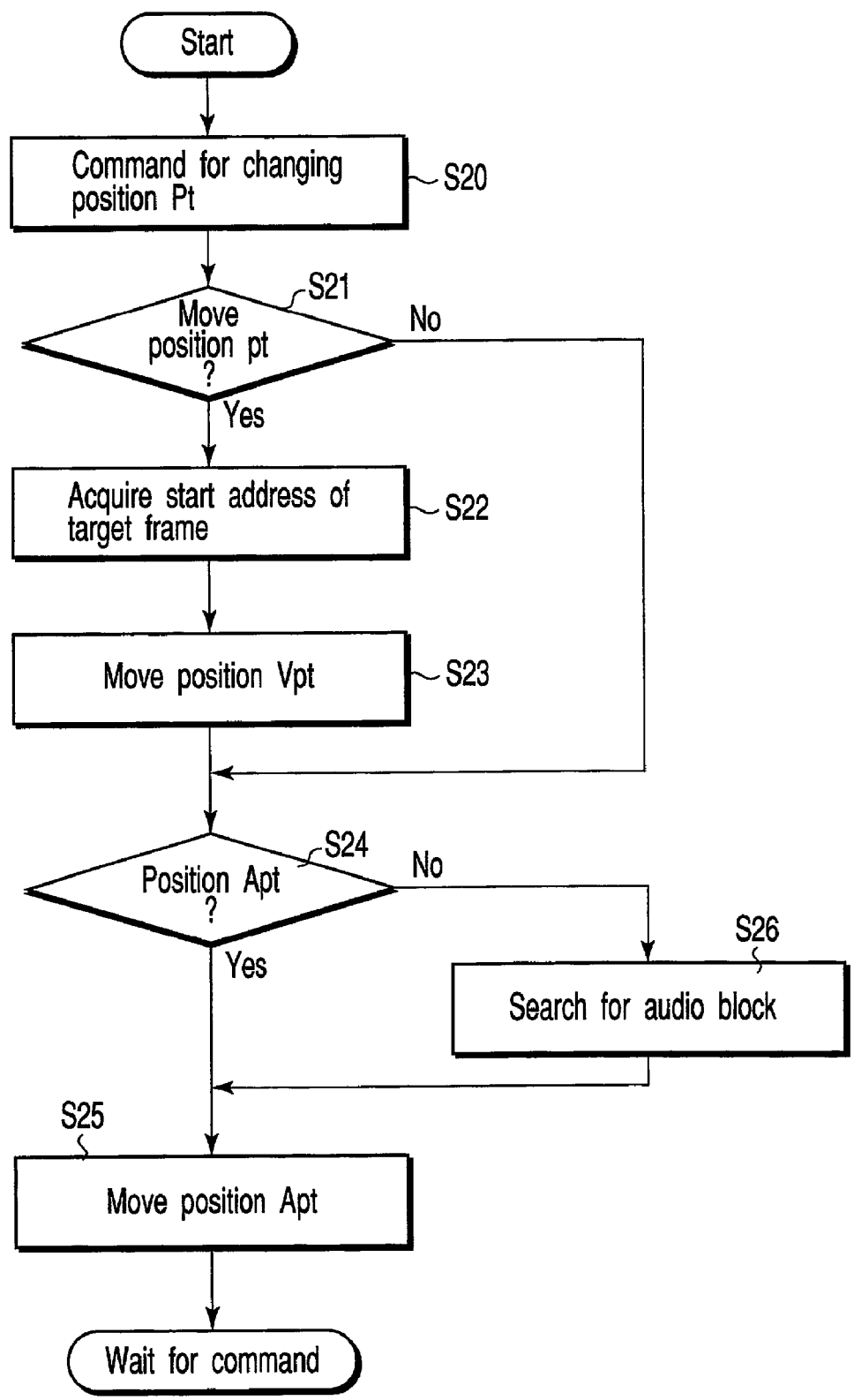
FIG. 9 is a flow chart for explaining playback when the AV-mixed data format according to the embodiment is used.

Special playback operations corresponding to pause, fast forward, and rewind according to this embodiment will be explained below for each type of data format of stream data, with reference to FIG. 2, FIG. 6, and flow charts in FIGS. 7 to 9.

Figure 2:
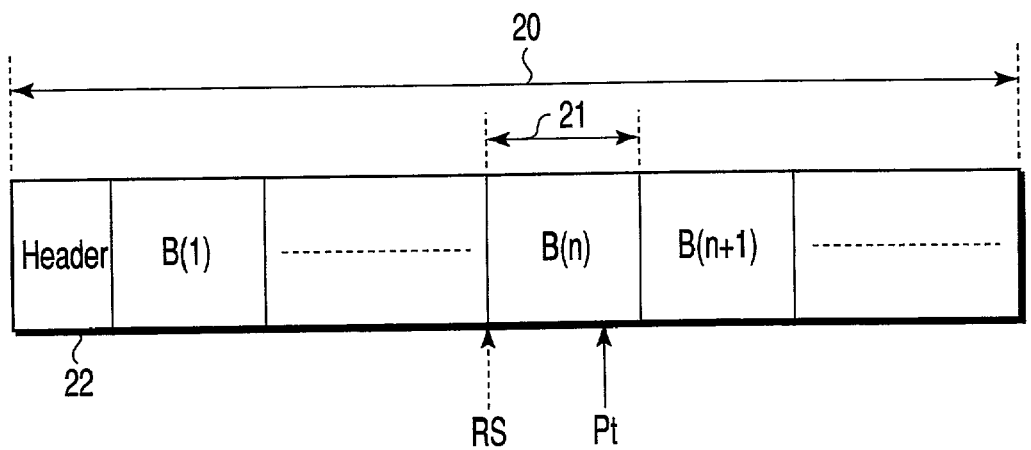
FIG. 2 is a view showing a fixed-length data format according to the embodiment.

First, as shown in FIG. 2, assume a fixed-length-compressed data format as stream data stored in a medium. Generally, a file 20 (e.g., a data amount of about one hour for moving images) is divided into blocks 21 (also called packets, frames, or groups in some cases) of a few bytes to a few kbytes. At the head of the file 20, header information 22 containing the block size and the number of blocks is placed. Header information is also placed at the head of each block 21.

Assume, as shown in FIG. 2, that the control system 10 executes, e.g., a pause process at a position Pt in a block B(n) while reading out the stream data of the file 20 from the medium and playing back the data. Pt means a read start pointer controlled by the control system 10.

Upon receiving a command (Pt position change command) for restarting playback after the pause process, the control system 10 controls the movement of the read start pointer Pt (step S1). That is, on the basis of the present position of the read start pointer Pt, the control system 10 checks whether the movement is necessary as a playback restart position (step S2). When the data is fixed-length-compressed data, the control system 10 calculates the present position of the read start pointer Pt from the total of data lengths read out from the file 20 and the known block size.

As shown in FIG. 2, if the present position of the pointer Pt is within the range of the block B(n) and restart is performed from this position, not all data in this block B(n) can be played back, resulting in mute (no playback) state. Therefore, the control system 10 moves the read start pointer Pt to the head of this block B(n) and restarts playback from this position (restart position RS) (YES in step S3, and step S4). If the restart position RS is not in the block B(n), the control system 10 moves the read start pointer Pt to the leading position of a block to be restarted (NO in step S3, and step S5).

Next, a special playback operation of stream data having a non-fixed-length-compressed data format will be explained below with reference to FIG. 3 and the flow chart in FIG. 8.

In the non-fixed-length-compressed data format, as shown in FIG. 3, the sizes of blocks 31 in a file 30 are not fixed but variable. Therefore, when data is compressed, an index 33 storing information 34 pertaining to individual block sizes (LD1, LDn, LDn+1, LDn+2, . . . ) is formed. The control system 10 saves the information of this index 33 as part of header information 32 or as another file.

When starting playback, the control system 10 records the position of the pointer Pt from the head (header 32) of the file 30. Accordingly, the control system 10 can detect the present position of the pointer Pt by referring to this recorded position and the information of the index 33.

Similar to the above explanation, assume the execution of a pause process at the position Pt of the block B(n). The control system 10 controls the movement of the read start pointer Pt (step S10). That is, on the basis of the present position of the read start pointer Pt, the control system 10 checks whether the movement is necessary as a playback restart position (step S11).

As shown in FIG. 3, if the present position of the pointer Pt is within the range of the block B(n) and restart is performed from this position, not all data in this block B(n) can be played back, resulting in a mute (no playback) state. Therefore, the control system 10 moves the read start pointer Pt to the head of this block B(n) and restarts playback from this position (restart position RS) (YES in step S11). That is, the control system 10 acquires the start address (the start address of a target frame) of the block B(n) by referring to the information of the index 33, and moves the read start pointer Pt to the leading position of a block to be restarted (YES in steps S12 and S13, and step S14). On the other hand, if the restart position RS in not in the block B(n), the control system 10 moves the read start pointer Pt to the leading position of a block to be restarted (NO in step S13, and step S15).

In addition, a special playback operation of stream data having a data format in which a plurality of different types of data are multiplexed and blocked in a single file 40 will be described below with reference to FIGS. 4 to 6B and the flow chart in FIG. 9.

As shown in FIG. 4, assume stream data in which blocks A(n) of audio data 41 and blocks V(n) of video data 42 are mixed as a plurality of different types of data. Generally, the data amount of the video data 42 is one order of magnitude larger than that of the audio data 41. As shown in FIG. 4, therefore, the blocks of the video data 42 continue (Vn, Vn+1, and Vn+2). This data format also has header information 43 of the file. Also, each block is composed of a header 400 and data 401.

When the stream data having this data format are to be simultaneously played back, synchronization between the blocks of the video data 42 and the blocks of the audio data 41 must be controlled. For this purpose, the control system 10 prepares a video data FIFO buffer 50 (FIG. 5A) and an audio data FIFO buffer 60 (FIG. 6A) in a RAM area of the system, and temporarily stores the two data read out from the medium and demultiplexed into these buffers. When performing playback, the control system 10 reads out the two data (V and A) from the FIFO buffers 50 and 60 and executes playback by a decoder.

Furthermore, when executing demultiplexing, the control system 10 forms a video data information table 51 (FIG. 5B) and an audio data information table 61 (FIG. 6B) in the RAM area of the system. The information table 51 stores buffer addresses (F1, F2, F3, . . . ) in the FIFO buffer 50 obtained in accordance with the block sizes or block boundary position information read out from the headers 400 of the individual blocks (Vn, Vn+1, and Vn+2). This information table 51 also stores time stamp information (time information Tb, Tc, Td, . . . ) of these blocks. Likewise, the information table 61 stores buffer addresses (F1, F2, . . . ) in the FIFO buffer 60 obtained in accordance with the block sizes or block boundary position information read out from the headers 400 of the individual blocks (An and An+1). This information table 61 also stores time stamp information (time information Ta, Te, . . . ) of these blocks.

When a pause process as described above is executed for this data format, the control system 10 determines a restart position in a block (video data block) as a base, and also determines a restart position in a subsequent block (audio data block) attached to the former block. In the determination of the subsequent block, the control system 10 refers to the time stamp information of the base block, and moves the restart position to the head of a block having the smallest time difference from the time indicated by the time stamp information. The process will be described in detail below with reference to the flow chart in FIG. 9.

Assume, for example, that a pause process is executed at a position VPt of the video block (Vn+2) and at a position APt of the audio block (An). The control system 10 first starts controlling the movement of the read start pointer VPt from the base block (Vn+2) (step S20).

On the basis of the present position of the read start pointer VPt in the video block (Vn+2), the control system 10 checks whether the movement is necessary as a playback restart position (step S21). The control system 10 acquires the start address (the start address of a target frame) of this video block (Vn+2) by looking up the information table 51, and moves the read start pointer VPt to a leading position VRS of the block to be restarted (steps S22 and S23).

Next, the control system 10 looks up the information tables 51 and 61 to check whether an audio frame substantially consistent with the restart time of the video block (Vn+2) as a base block exists in the synchronized attached block (An) (step S24). If this audio frame exists, the control system 10 moves the read start pointer APt to a leading position ARS of the frame in the block (An) to be restarted (YES in step S24, and step S25). If no such audio frame exists, the control system 10 searches for an audio block containing an audio frame corresponding to the read start pointer VPt in the video block (Vn+2) (step S26). The control system 10 moves the read start pointer APt to the leading position of the frame in the found audio block (step S25).

In this embodiment as described above, in a special playback operation in which playback is restarted after a pause process or the like, the read start pointer Pt is moved to the head of the corresponding data block or to the leading position of the frame. Consequently, the special playback operation can be reliably realized without causing any playback error in a decoder. Also, even when a data format in which a plurality of different types of data blocks such as video and audio data blocks are mixed is used, a reliable special playback operation can be realized while a playback synchronization difference between these data blocks is minimized.

Although a pause process is explained in the above embodiment, the present invention is also applicable to a special playback operation in which playback is restarted after fast forward or rewind. In short, special playback functions corresponding to pause, fast forward, and rewind can be realized independently of a data format. Accordingly, a digital recording/playback apparatus of the present invention can be applied not only to a digital codec apparatus assuming an in-stream playback function but also to a digital information apparatus assuming a playback function which can effectively achieve a random access function.

As has been described in detail above, the present invention can provide a digital recording/playback apparatus capable of realizing special playback functions corresponding to pause, fast forward, and rewind, when playing back stream data from a medium which can be randomly accessed. This makes it possible to realize a digital information apparatus assuming a playback function capable of effectively achieving a random access function, in addition to a digital codec apparatus which simply performs in-stream playback.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital recording/playback apparatus comprising:
    data storage means for storing stream data having a data format including a plurality of different-type data blocks in a single file;
    means for playing back the stream data read from the data storage means; and
    playback control means for setting a read start position of the stream data at a leading frame position of a first-type data block as a main and at a leading frame position of a second-type data block as a sub when the means for playing back plays back the stream data from the data storage means,
    wherein the playback control means, when the read start position is set at the leading frame position of the second-type data block as the sub, refers to time stamp information recorded in the first-type data block as the main, determines the second-type data block having the smallest time difference from a time indicated by the referred time stamp information, and further comprises a buffer memory for storing the stream data corresponding to a first data block and a second data block read from the data storage means and an information table storing buffer addresses and time stamp information corresponding to the first data block and the second data block stored in the buffer memory.

2. An apparatus according to claim 1, wherein the setting by the playback control means is executed after performing a pause, a fast forward, or a rewind.

3. An apparatus according to claim 1, wherein the plurality of different-type data blocks include audio data and video data.

* * * * *

UNITED STATES PATENT AND TRADEMARK OFFICE
CERTIFICATE OF CORRECTION

| | | |
|---|---|---|
| PATENT NO. | : 7,206,496 B2 | Page 1 of 1 |
| APPLICATION NO. | : 10/025781 | |
| DATED | : April 17, 2007 | |
| INVENTOR(S) | : Toshihiro Morohoshi et al. | |

It is certified that error appears in the above-identified patent and that said Letters Patent is hereby corrected as shown below:

Title Page

Item (30), in the Foreign Application Priority Data, delete:

"Dec. 27, 2000 (JP) 2000-398856"

Signed and Sealed this

Twenty-sixth Day of June, 2007

JON W. DUDAS
*Director of the United States Patent and Trademark Office*